United States Patent Office.

FRANK J. PAGE AND HARRY A. ANDERSON, OF WATERBURY, CONNECTICUT.

METHOD OF SOLDERING ALUMINUM.

SPECIFICATION forming part of Letters Patent No. 452,800, dated May 26, 1891.

Application filed December 26, 1890. Serial No. 375,875. (No specimens.)

*To all whom it may concern:*

Be it known that we, FRANK J. PAGE and HARRY A. ANDERSON, citizens of the United States, residing at Waterbury, in the county of New Haven and State of Connecticut, have invented certain new and useful Improvements in Soldering Aluminum; and we do hereby declare the following to be a full, clear, and exact description of the invention, such as will enable others skilled in the art to which it appertains to make and use the same.

This invention relates to certain novel and useful improvements in joining pieces of aluminum; but more particularly does it appertain to a flux for use either with ordinary solder or with specially-prepared metallic soldering compositions, either in joining pieces of aluminum to like pieces or in joining pieces of aluminum to other metals. Owing to the difficulty, which amounts almost to an impossibility, of forming a solder-joint between two pieces of aluminum, it is now customary to utilize between the sections to be fastened together a binding-strip of brass or other metal which is capable by present methods of being more or less successfully soldered to the aluminum; but if a strong and perfectly-tight joint is desired it is necessary to resort to rivets or other mechanical fastenings.

Our invention, in view of the foregoing, consists in the use in soldering of the chloride or other salt of silver as a flux. Perfectly-tight joints may be made between adjacent surfaces of aluminum, either lapped or abutted, by the use of ordinary solder in connection with this flux, and also between dissimilar metals, of which aluminum is one.

We produce the chloride of silver by any usual chemical process; but the following is practical and operative: Into a vessel containing nitric acid, which is preferably heated in a water bath, we dissolve metallic silver to the point of saturation. Into this saturated solution we introduce salt or other substance containing chlorine in quantity sufficient to precipitate the chloride of silver. We then decant the liquid, fuse the precipitate so far as to bring it to a solid mass, and then comminute it; or we may obtain the chloride of silver by treating commercial nitrate of silver with chlorine.

In joining together two pieces of metal, one or both of which are aluminum, we first place them in such relative positions as is desired in the joint. Then along the line of desired juncture we thinly spread the flux above described. Then by means of a blow-pipe or other suitable device we introduce upon the surfaces of the parts to be joined melted solder which, as soon as it strikes the line of flux, follows it rapidly to the end, running most freely, and then setting into a hard perfectly-solid joint, which will neither crack, flake, nor check.

We contemplate using the chloride of silver either in comminuted or other form, the gist of our invention resting in the broad idea of using the chloride or other equivalent salt of silver as a flux in soldering aluminum.

We claim—

The method of soldering aluminum, which consists of fluxing the surfaces to be joined with the chloride of silver and then introducing solder upon said surfaces, substantially as described.

In testimony whereof we affix our signatures in presence of two witnesses.

FRANK J. PAGE.
    HARRY A. ANDERSON.

Witnesses:
 WILSON H. PIERCE,
 G. BENJ. ABBOTT.